United States Patent
Goldenberg et al.

(10) Patent No.: US 9,637,186 B1
(45) Date of Patent: May 2, 2017

(54) DUAL MODE VEHICLE

(71) Applicant: Engineering Services Inc., Toronto (CA)

(72) Inventors: Andrew A. Goldenberg, Toronto (CA); Jun Lin, Richmond Hill (CA)

(73) Assignee: ENGINEERING SERVICES INC., Toronto, ON (CA)

( * ) Notice: Subject to any disclaimer, the term of this patent is extended or adjusted under 35 U.S.C. 154(b) by 0 days.

(21) Appl. No.: 14/958,629

(22) Filed: Dec. 3, 2015

(51) Int. Cl.
   *B62D 55/02* (2006.01)
   *B62D 55/04* (2006.01)

(52) U.S. Cl.
   CPC ............. *B62D 55/04* (2013.01); *B62D 55/02* (2013.01)

(58) Field of Classification Search
   CPC ................................ B62D 55/04; B62D 55/02
   USPC ........ 180/9.28, 9.34, 9.3, 9.32, 8.1, 8.2, 8.3, 180/8.7
   See application file for complete search history.

(56) References Cited

U.S. PATENT DOCUMENTS

| | | | | |
|---|---|---|---|---|
| 1,509,030 | A * | 9/1924 | Roy | B62D 55/02 105/72.2 |
| 4,391,343 | A * | 7/1983 | Deare | B62D 63/061 180/198 |
| 4,702,331 | A | 10/1987 | Hagihara et al. | |
| 4,977,971 | A | 12/1990 | Crane, III et al. | |
| 6,774,597 | B1 | 8/2004 | Borenstein | |
| 7,475,745 | B1 * | 1/2009 | DeRoos | B62D 55/02 180/8.1 |
| 7,874,386 | B2 | 1/2011 | Ben-Tzvi et al. | |
| 8,185,241 | B2 | 5/2012 | Jacobsen | |
| 8,216,020 | B2 | 7/2012 | Zimet | |
| 8,360,178 | B2 | 1/2013 | Goldenberg et al. | |
| 8,393,422 | B1 | 3/2013 | Pensel | |
| 8,662,215 | B1 * | 3/2014 | Ohm | B25J 5/005 180/8.2 |
| 8,800,695 | B2 | 8/2014 | Couture et al. | |
| 9,096,281 | B1 * | 8/2015 | Li | B62D 55/02 |
| 2006/0012144 | A1 | 1/2006 | Kunzler et al. | |
| 2006/0124366 | A1 | 6/2006 | Le Masne De Chermont | |
| 2008/0011525 | A1 | 1/2008 | Kang et al. | |
| 2008/0167752 | A1 * | 7/2008 | Jacobsen | B62D 55/0655 700/250 |
| 2010/0163323 | A1 | 7/2010 | Pickholz | |

(Continued)

FOREIGN PATENT DOCUMENTS

KR       2011072535 A  *  6/2011

OTHER PUBLICATIONS

Machines & Mechanisms Applied Kinematic Analysis Fourth Edition by David H. Myszka.*

*Primary Examiner* — Jacob Knutson
(74) *Attorney, Agent, or Firm* — Hill & Schumacher

(57) ABSTRACT

A mobile vehicle includes a platform, a pair of track assemblies and a pair of wheel assemblies. The pair of track assemblies is attached to opposing sides of the platform. The pair of wheel assemblies is attached to opposing sides of the platform. Each wheel assembly has at least a first and second wheel and a track-wheel interchange mechanism operably connected to the first and second wheel. The track-wheel interchange mechanism rotatably moves the first and second wheel from wheel mode wherein the wheels drive the mobile vehicle to a track mode wherein the track assemblies drive the mobile vehicle.

18 Claims, 21 Drawing Sheets

(56) References Cited

U.S. PATENT DOCUMENTS

| | | | |
|---|---|---|---|
| 2011/0190935 A1* | 8/2011 | Hutcheson | B25J 5/007 700/258 |
| 2013/0062153 A1* | 3/2013 | Ben-Tzvi | B62D 55/02 192/71 |
| 2013/0078888 A1 | 3/2013 | Mayer et al. | |
| 2014/0031977 A1 | 1/2014 | Goldenberg et al. | |
| 2015/0210327 A1* | 7/2015 | Wolf | B62D 55/084 180/9.28 |

\* cited by examiner

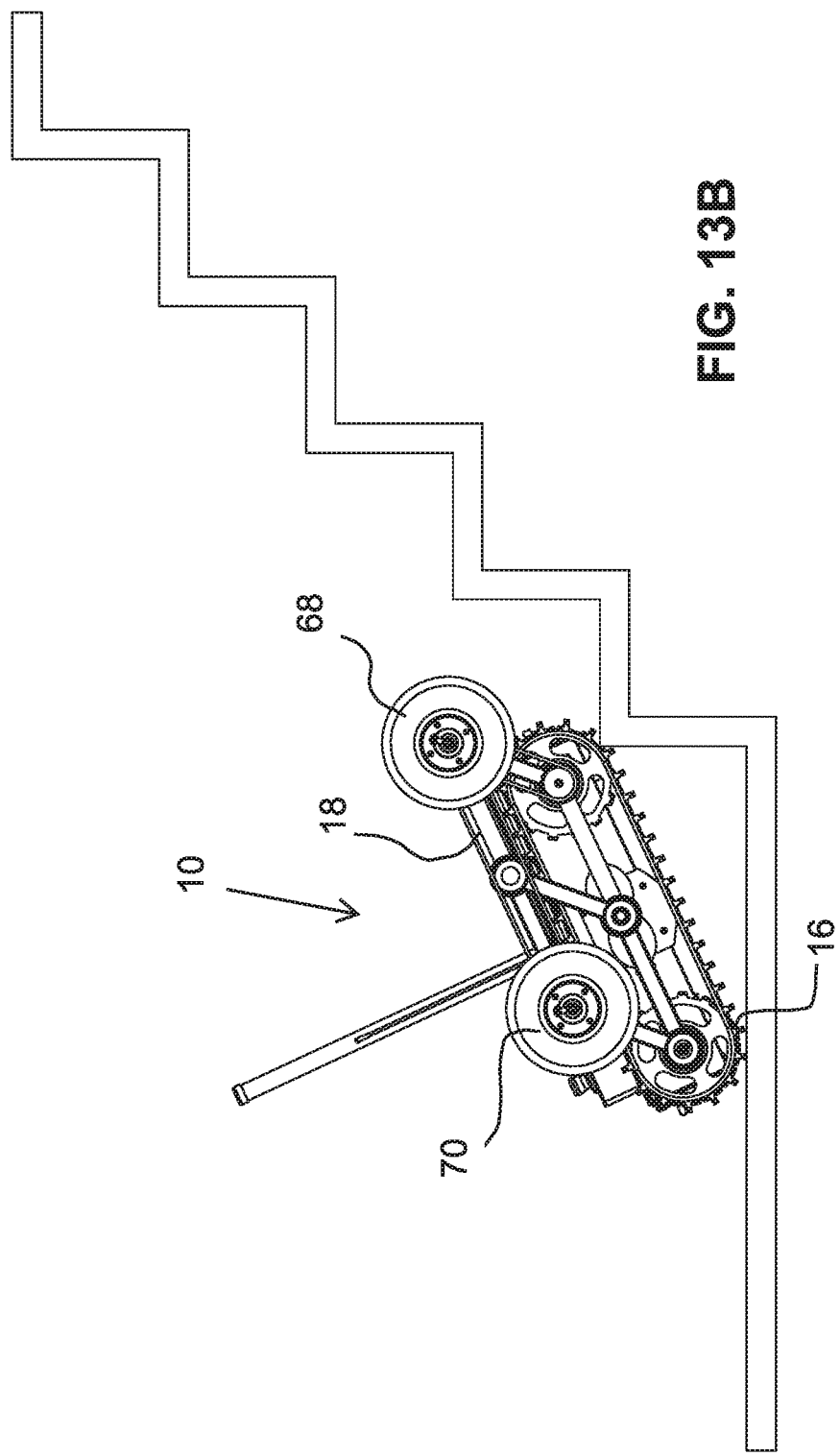

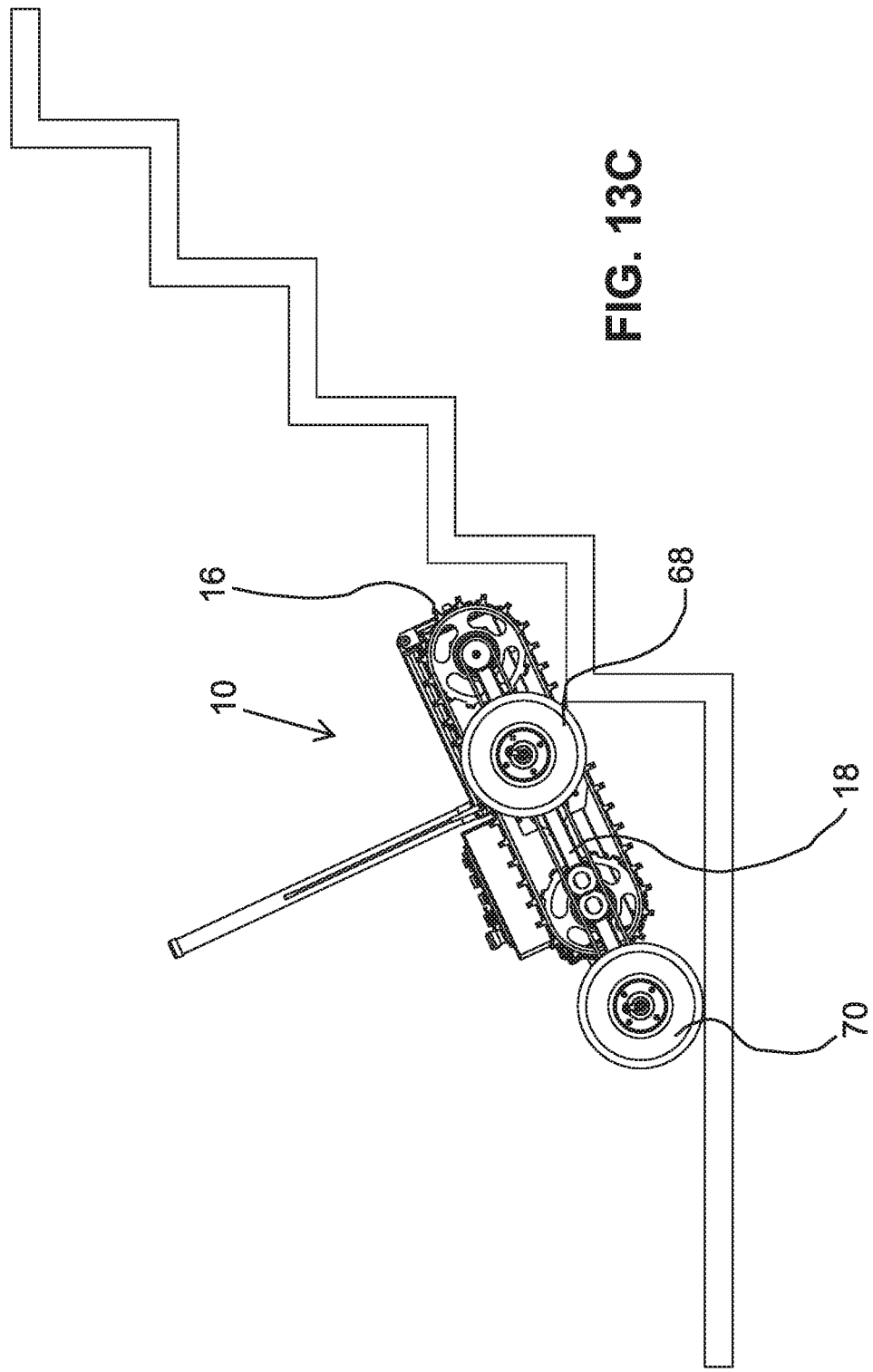

DUAL MODE VEHICLE

FIELD OF THE DISCLOSURE

This disclosure relates to mobile vehicles or robots and in particular vehicles or robots that are capable of moving on various types of terrains. The mobile vehicle herein has two interchangeable modes, namely a track mode and a wheel mode.

BACKGROUND

Mobile vehicles or robots are used in a variety of applications such as space exploration, material transportation, and civilian, military, and law enforcement. By way of example, mobile vehicles are used by space scientists for planetary exploration, by law enforcement forces for EOD (Explosive Ordnance Disposal), SWAT (Special Weapons and Tactics), and IED (Improvised Explosive Device). Such applications have been in effect since early 90s.

The capability of a mobile vehicle or robot to travel over a wide range of unknown terrains with minimal human interference, even autonomously, is a challenge for designers of mobile vehicles or robots. Notwithstanding, the majority of current mobile vehicle platforms are either wheeled or track-based, or both by manual conversion from one mode to the other. Wheels are suitable for motion over smooth, plain terrain at high speed, whereas tracks are suitable for motion over unstructured terrain, such as stairs, slopes, obstacles, and ditches at lower speed. The major problem in most practical circumstances is that it may be beneficial to switch intermittently between wheels and tracks without manual conversion. If the terrain is unknown or unstructured, or there is a security mission in an urban setting that involves flat terrain (street) and stairs, a wheeled robot may be unsuitable for some of the tasks and a tracked robot may be too slow for most of the tasks.

Some mobile vehicles provide manually reconfigurable track-wheeled locomotion thus offering the advantages of both types of systems; however there are limitations. Manually reconfigurable track-wheeled mobile vehicles can only use one option of mobility at a time. Examples of these are found in US patent application #2009/0266628A1 to Schempf et al., published on Oct. 29, 2009. The inherent limitation in the use of manually reconfigurable track-wheeled mobile vehicles is that the terrain must be known a priori for the operator to select one mode or the other for the required mission that is controlled remotely.

In the case of tracked robots it is known that adding a pair of tracked flippers pivotally attached to both sides of the chassis at one or both ends or at the center of the chassis' side panels enhances the ability of the mobile vehicle to maneuver stairs and overcome obstacles, as shown in U.S. Pat. No. 6,263,989 issued to Won on Jul. 24, 2001 and U.S. Pat. No. 7,493,976 issued to Goldenberg et al. on Feb. 24, 2009. These robots provide remote controlled variable configuration articulated tracked mobile vehicles to ease the overcoming of obstacles.

Another approach is with concurrent operation of tracks and wheels. However, there are disadvantages with this approach due to wheel interference while overcoming obstacles in the track mode and additional loading due to tracks in the wheel mode. Examples of this approach are shown in U.S. Pat. No. 5,022,812 issued to Coughlan et al. on Jun. 11, 1991 and in US patent application #2008/0258550 to Webster et al. and published on Oct. 23, 2008.

Another approach is to run the robot on tracks, and then attach wheels on the pulleys' shafts converting the robot to wheeled, and vice-versa. However, this can only be done manually, not remotely from a distance, or autonomously. Another approach is to run the robot on tracks mounted over the wheels. In this example, when the wheels are to be used, the tracks are manually removed and alternatively, if the robot is running on wheels, tracks can be applied manually over the wheels and locked in place, rendering the mobile vehicle as running on tracks. All these approaches have limitations because of the need to perform the conversions track-wheel and vice-versa manually. Accordingly it would be advantageous to provide a mobile vehicle that can by remote control or autonomously convert between track and wheel modes.

SUMMARY

The present disclosure relates to a mobile vehicle having a platform, a pair of track assemblies and a pair of wheel assemblies. The pair of track assemblies is attached to opposing sides of the platform. The pair of wheel assemblies is attached to opposing sides of the platform. Each wheel assembly has at least a first and second wheel and a track-wheel interchange mechanism operably connected to the first and second wheel. The track-wheel interchange mechanism rotatably moves the first and second wheel from wheel mode to a track mode. In the wheel mode the wheels drive the mobile vehicle and in the track mode the track assemblies drive the mobile vehicle.

The track-wheel interchange mechanism may have a front and back intermediate mode wherein the track assemblies and the wheel assemblies work together to drive the robot.

The first wheel may be a drive wheel and the second wheel may be a driven wheel.

The track-wheel interchange mechanism may include a parallel 4-bar mechanism.

The parallel 4-bar mechanism may include a crank that is operably connected to a central shaft drive motor.

The central shaft drive motor may include a central drive shaft module.

The parallel 4-bar mechanism may also include a drive follower and a driven follower and the driven follower is operably connected to a drive motor.

The track-wheel interchange mechanism may also include a first and a second chain-sprocket mechanism.

The first chain-sprocket mechanism may operably connect the drive motor to drive wheel and the second chain-sprocket mechanism may connect the drive wheel to the driven wheel.

The track-wheel interchange mechanism may also include a first and a second timing belt mechanism.

The first timing belt mechanism may operably connect the traction drive motor to drive wheel and the second timing belt mechanism may connect the drive wheel to the driven wheel.

Each track assembly may include a track positioned around a drive pulley and a driven pulley and the drive pulley may be operably connected to the traction drive motor.

The traction drive motor may be included in a traction drive module.

The mobile vehicle may also include a pair of traction drive modules, each traction drive module may be operably connected to one of the pair of track assemblies and wheel assemblies, the pair of traction drive modules may have a track drive mode and a wheel drive mode.

Each traction drive module may have one motor that is selectively connectable to one of the pair of track assemblies and one of the pair of wheel assemblies.

The pair of track assemblies and the pair of wheel assemblies may form a pair of track-wheel driving modules attached to opposing sides of the platform.

The pair of wheel assemblies may rotate from the track mode to the wheel mode responsive to a remote control command.

The pair of wheel assemblies may rotate from the track mode to the wheel mode autonomously.

The platform may include a head module, a core module and a power module that are removable and replaceable.

Further features will be described or will become apparent in the course of the following detailed description.

BRIEF DESCRIPTION OF THE DRAWINGS

The embodiments will now be described by way of example only, with reference to the accompanying drawings, in which.

DETAILED DESCRIPTION

Figure 1:
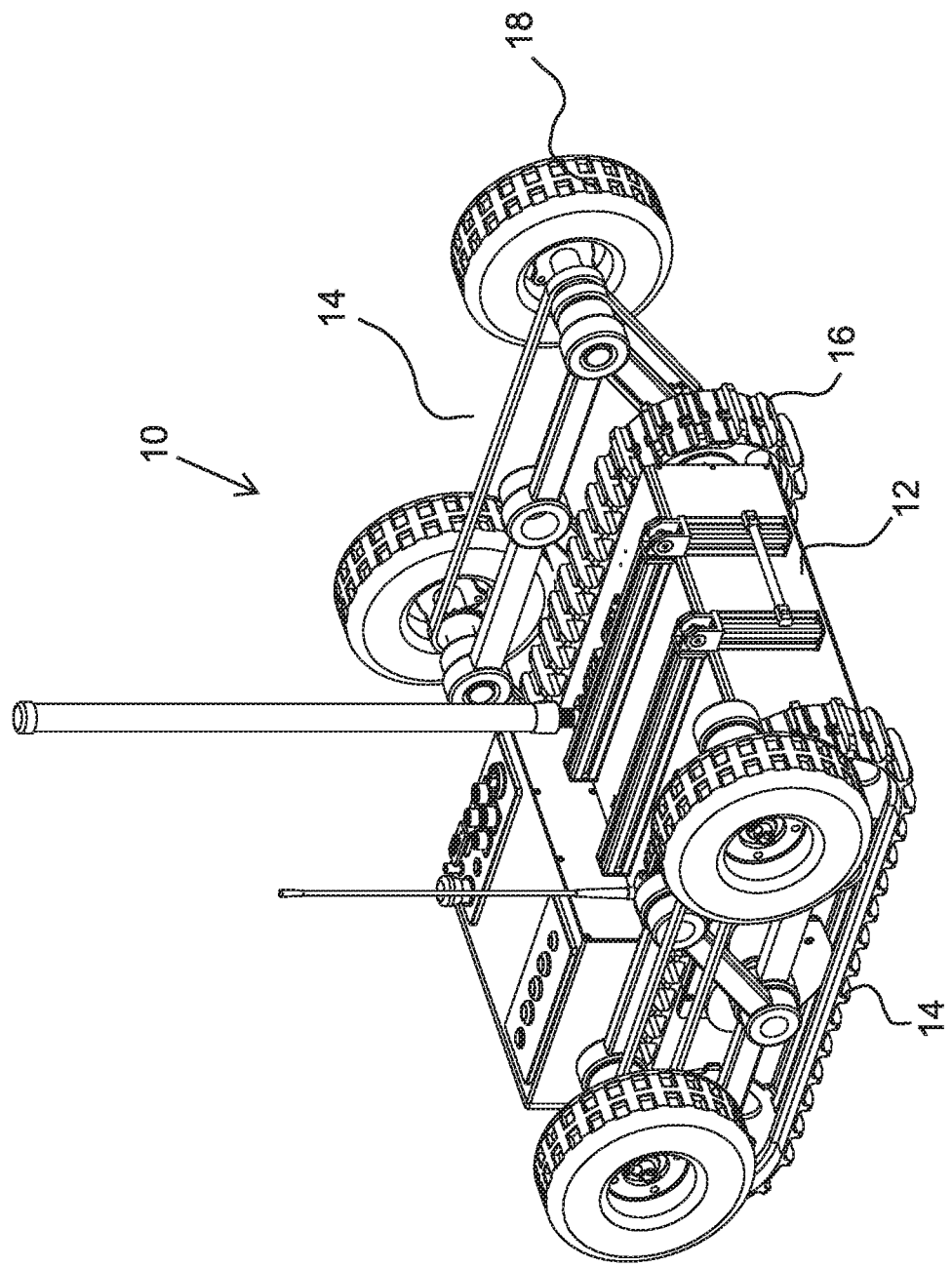
FIG. 1 is a perspective view of a dual mode vehicle.

Referring to FIG. 1, a dual mode vehicle is shown generally at 10. Mobile vehicle 10 includes a platform 12 and a pair of track-wheel driving modules 14 attached to opposite sides of the platform. Each of the track-wheel driving modules 14 has a track assembly 16 and a wheel assembly 18 attached to opposing side of the platform 12.

Figure 13A:
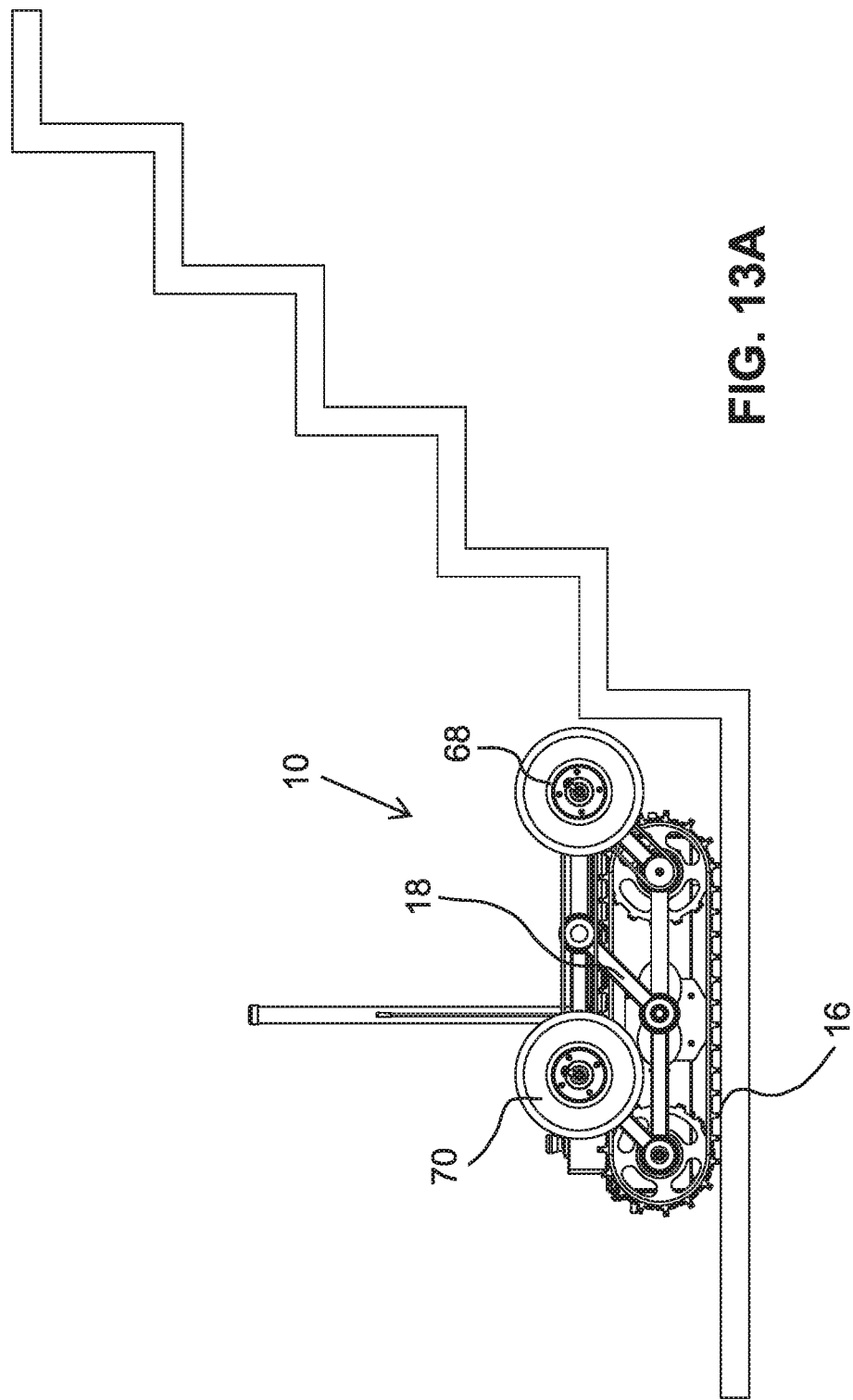
FIGS. 13 A to D is a perspective view of the steps of the dual mode vehicle climbing stairs with A at the bottom of the stairs, B starting to climb the stairs, C rotating the track-wheel interchange mechanism for climbing stairs, and D moving up the stairs.
Figure 13D:
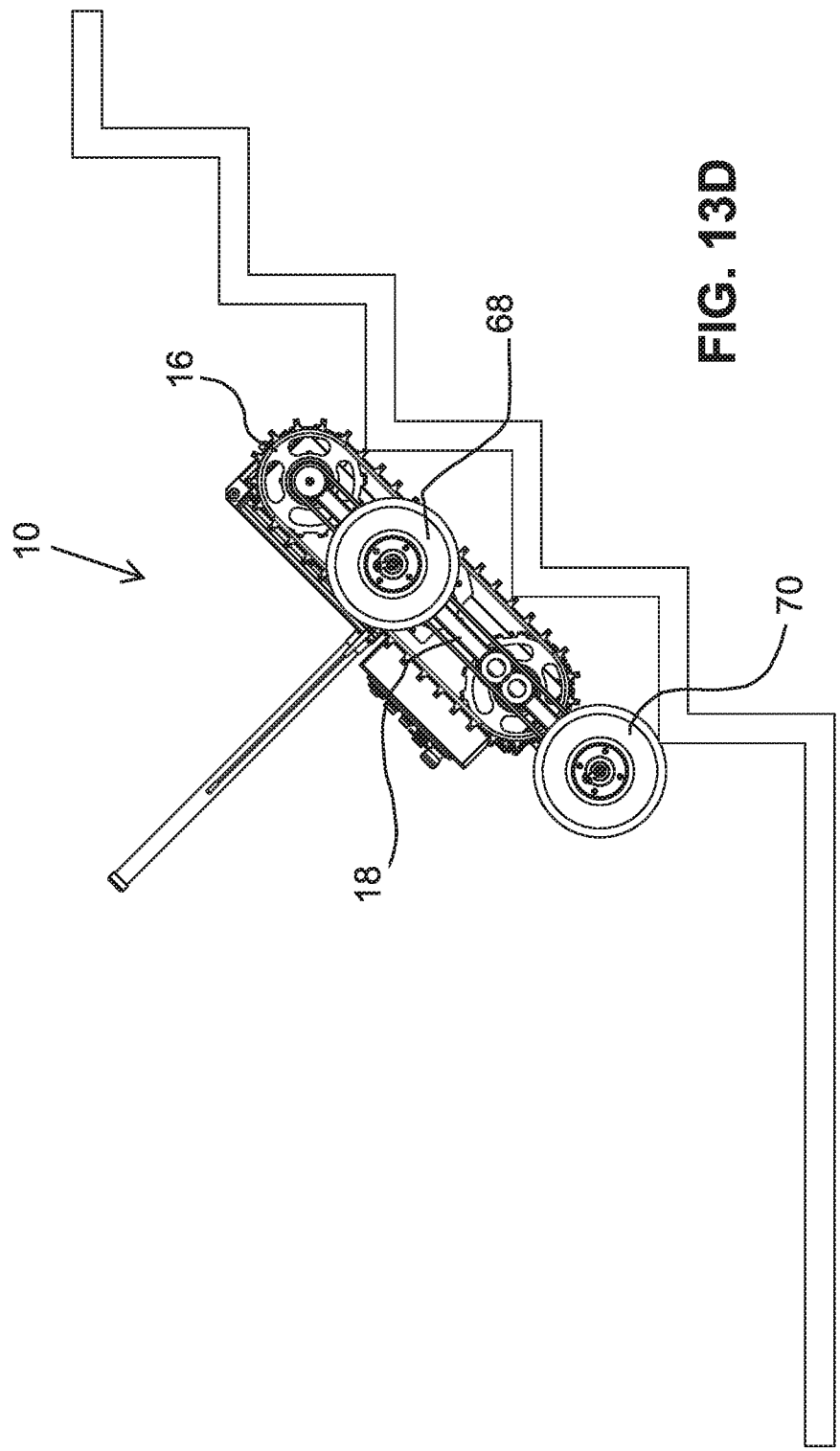
Figure 14A:
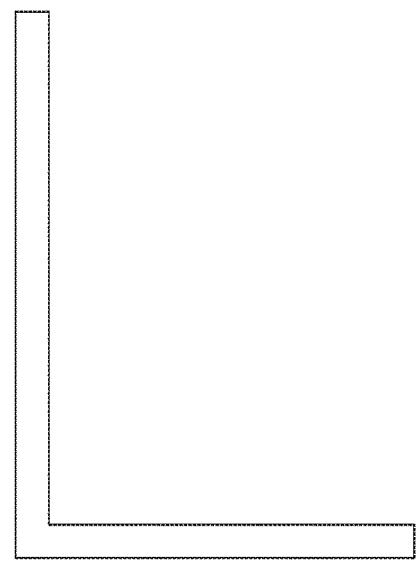
FIG. 14 A to E is a perspective view of the steps of the dual mode vehicle crossing a ditch with A approaching the ditch, B starting to cross the ditch, C in the middle of crossing the ditch, D finishing crossing the ditch and E finished crossing the ditch.
Figure 14A:
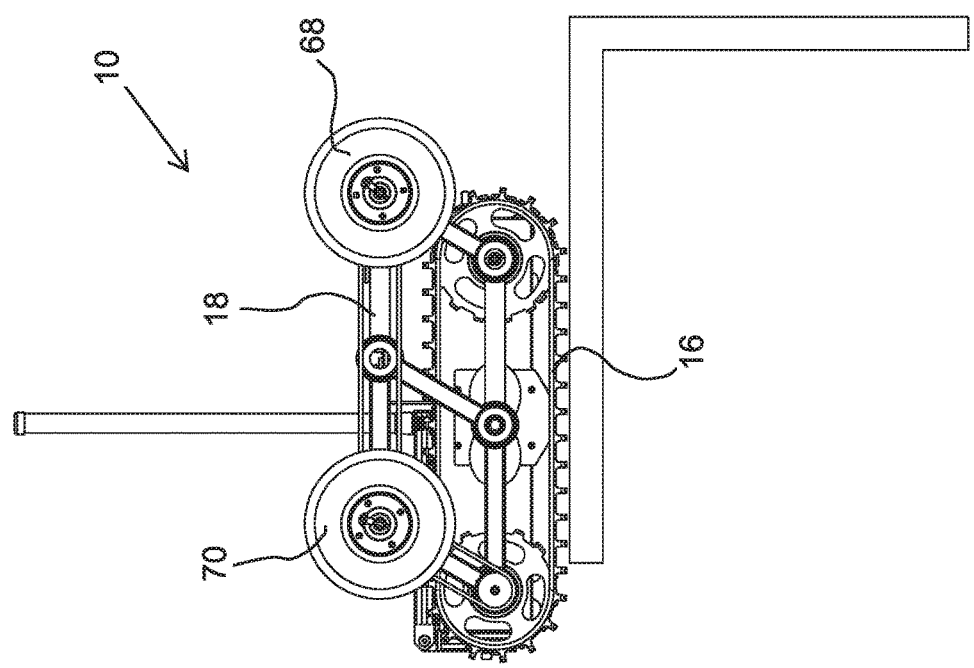
Figure 14B:
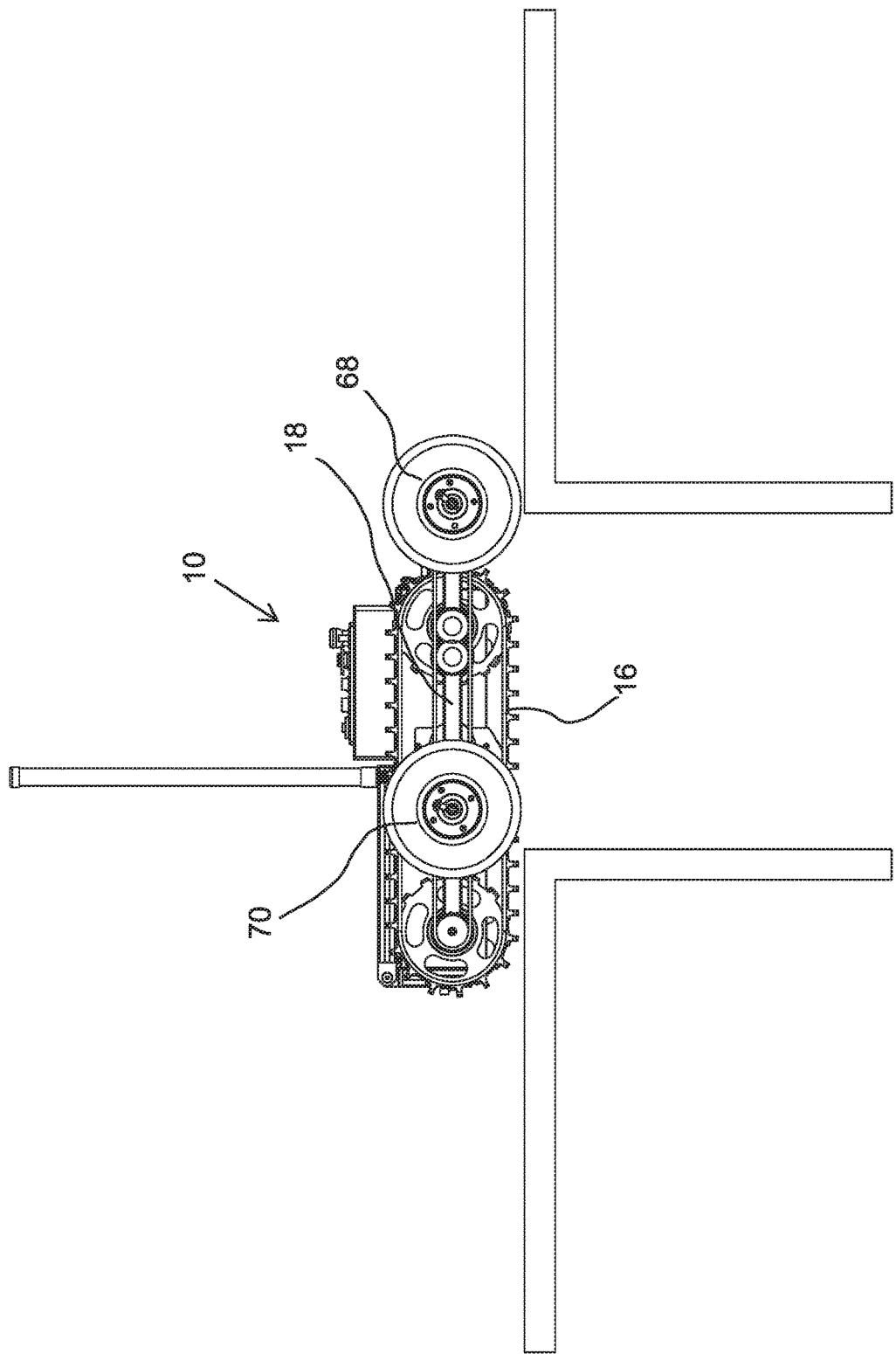
Figure 14C:
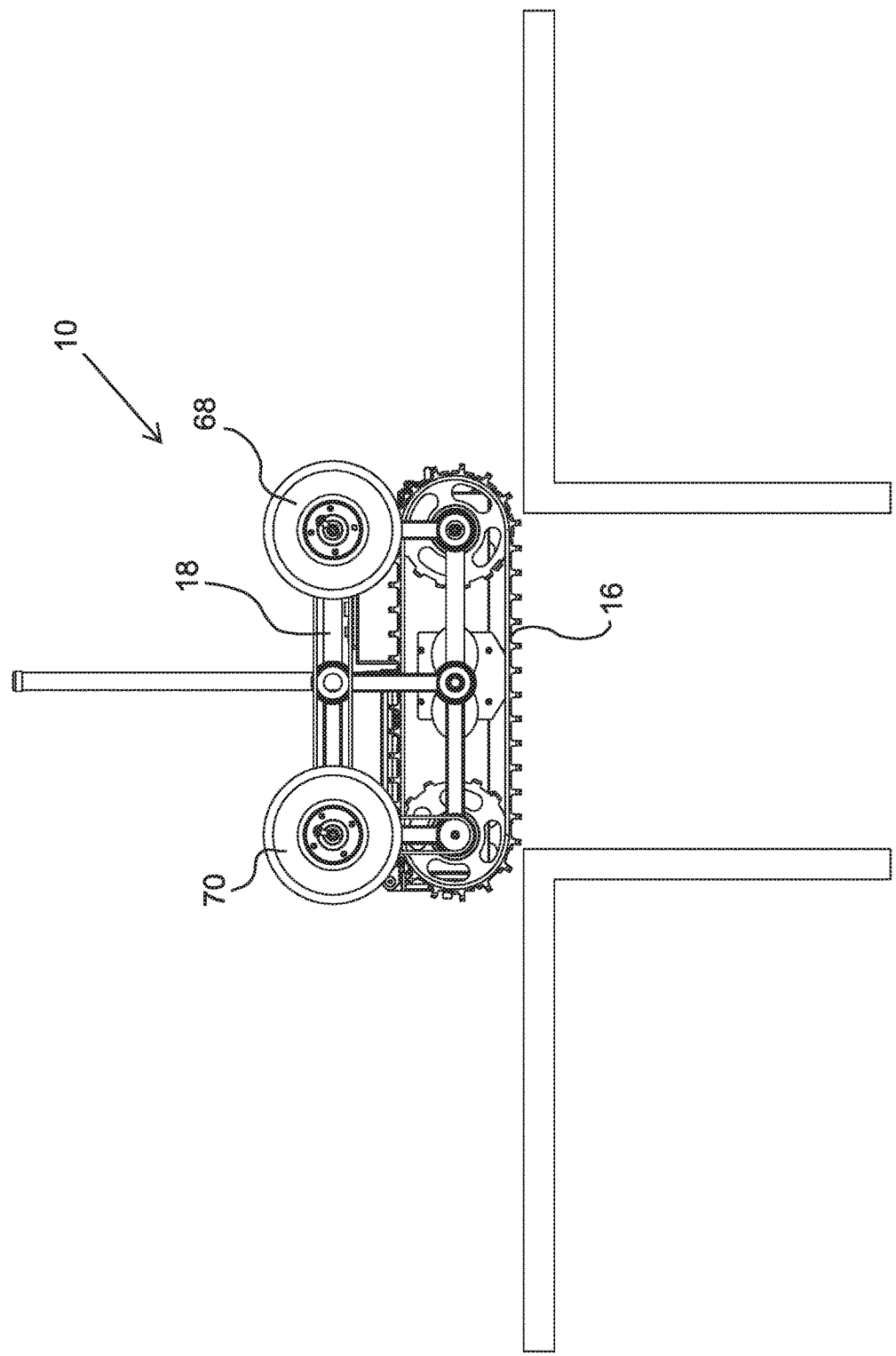
Figure 14D:
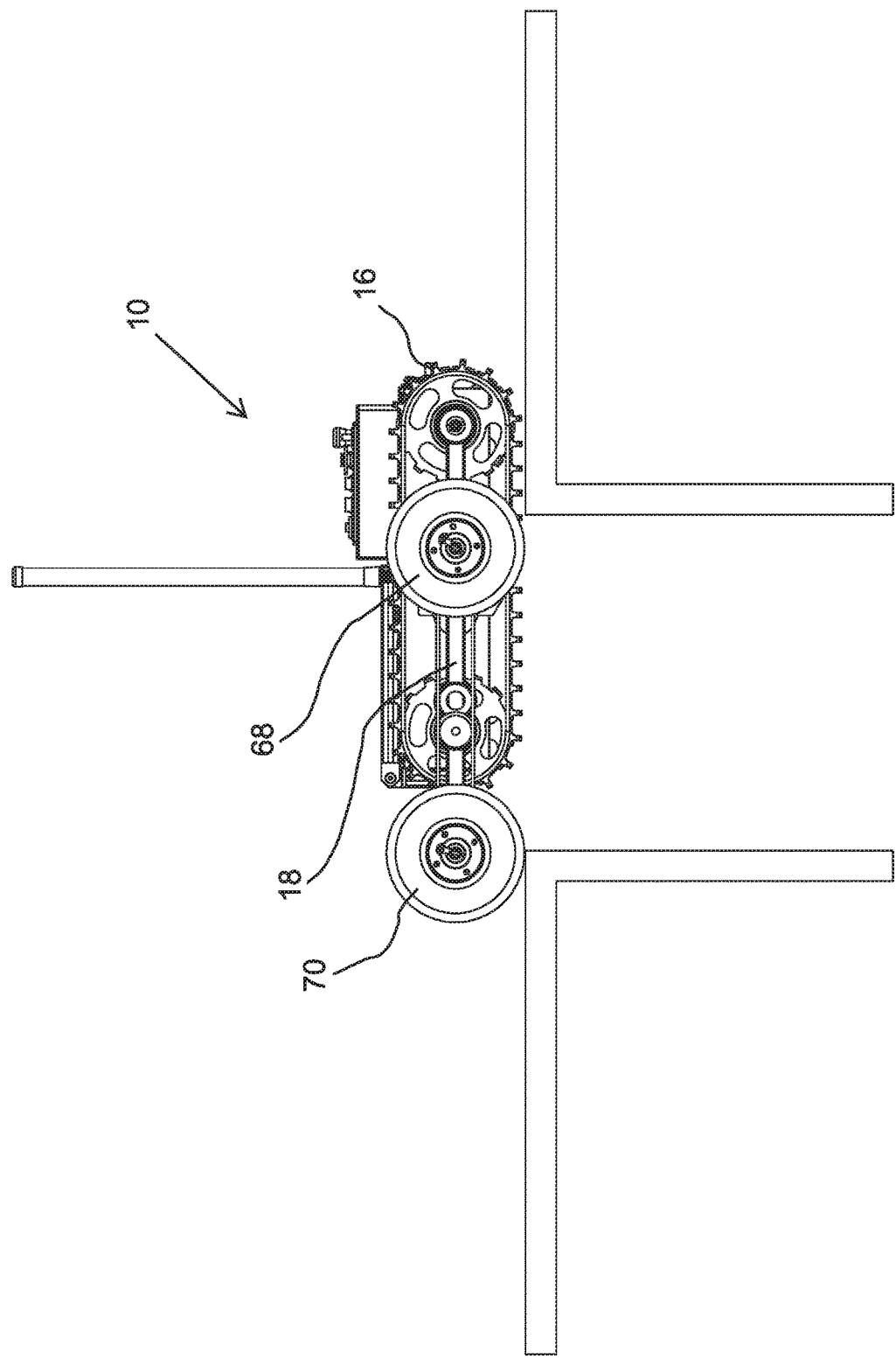
Figure 14E:
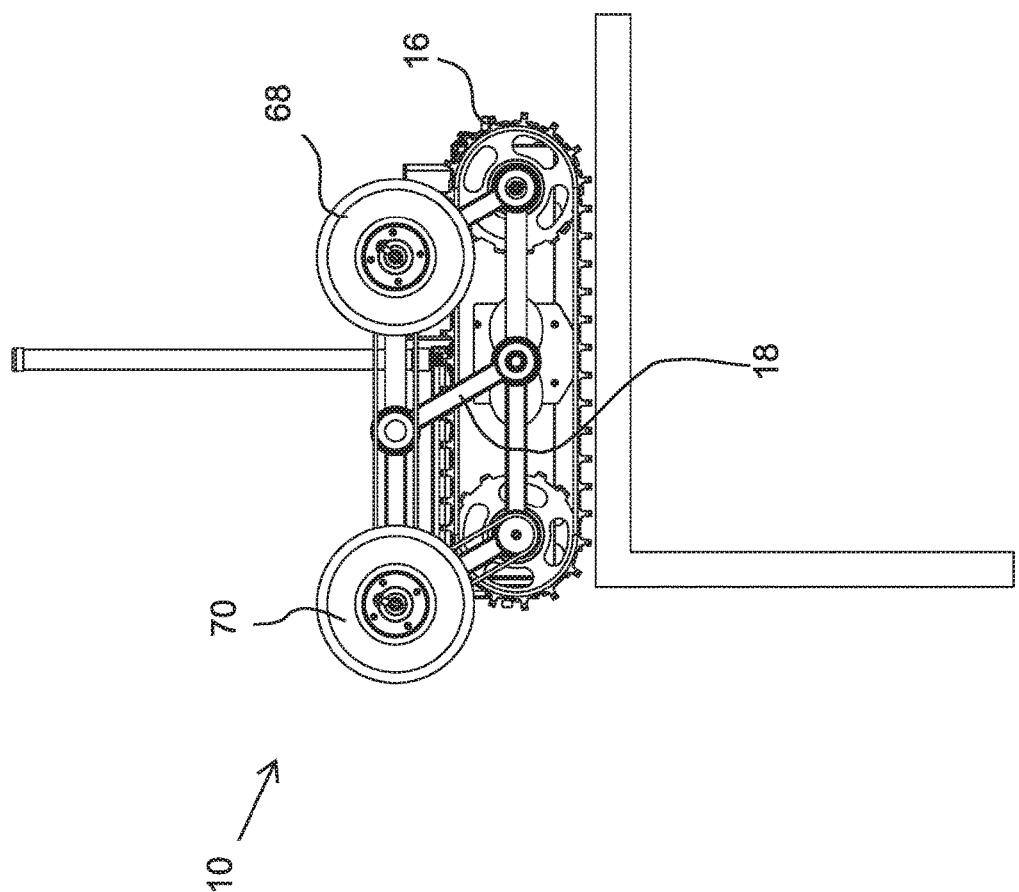

Each of the track-wheel driving modules 14 is moveable by remote control responsive to a remote control command or autonomously from one mode—track configuration to the other mode—wheel configuration, and vice versa. By way of example only, the track-wheel driving modules 14 may move autonomously from one mode to another responsive to detected conditions. For example, when the robot detects stairs it could autonomously move from the wheel mode to the track mode. Thus, dual mode vehicle 10 allows in-field flexibility according to the terrain conditions. In the track mode the pair of track assemblies 16 drive the mobile vehicle 10 and in the wheel mode the pair of wheel assemblies 18 drive the mobile vehicle. There are also a front intermediate mode and a back intermediate mode wherein the pair of track assemblies and the pair of wheel assemblies work together to drive the mobile vehicle 10 as shown in FIGS. 13 A to D and 14 A to E.

Dual mode vehicle 10 as shown in FIG. 1 has a dual drive system that is composed of a pair of track assemblies 16 and a pair of wheel assemblies 18 attached to opposing sides of the platform 12. The dual mode vehicle 10 combines wheels and tracks to allow interchangeability according to the terrain conditions. The wheel and track are driven separately but with the same motor. The dual mode vehicle 10 can automatically or in response to a remote control command convert from a wheeled robot into a track-based robot or vice-versa by rotatably moving a track-wheel interchange mechanism 50 (described in more detail below).

Figure 2:
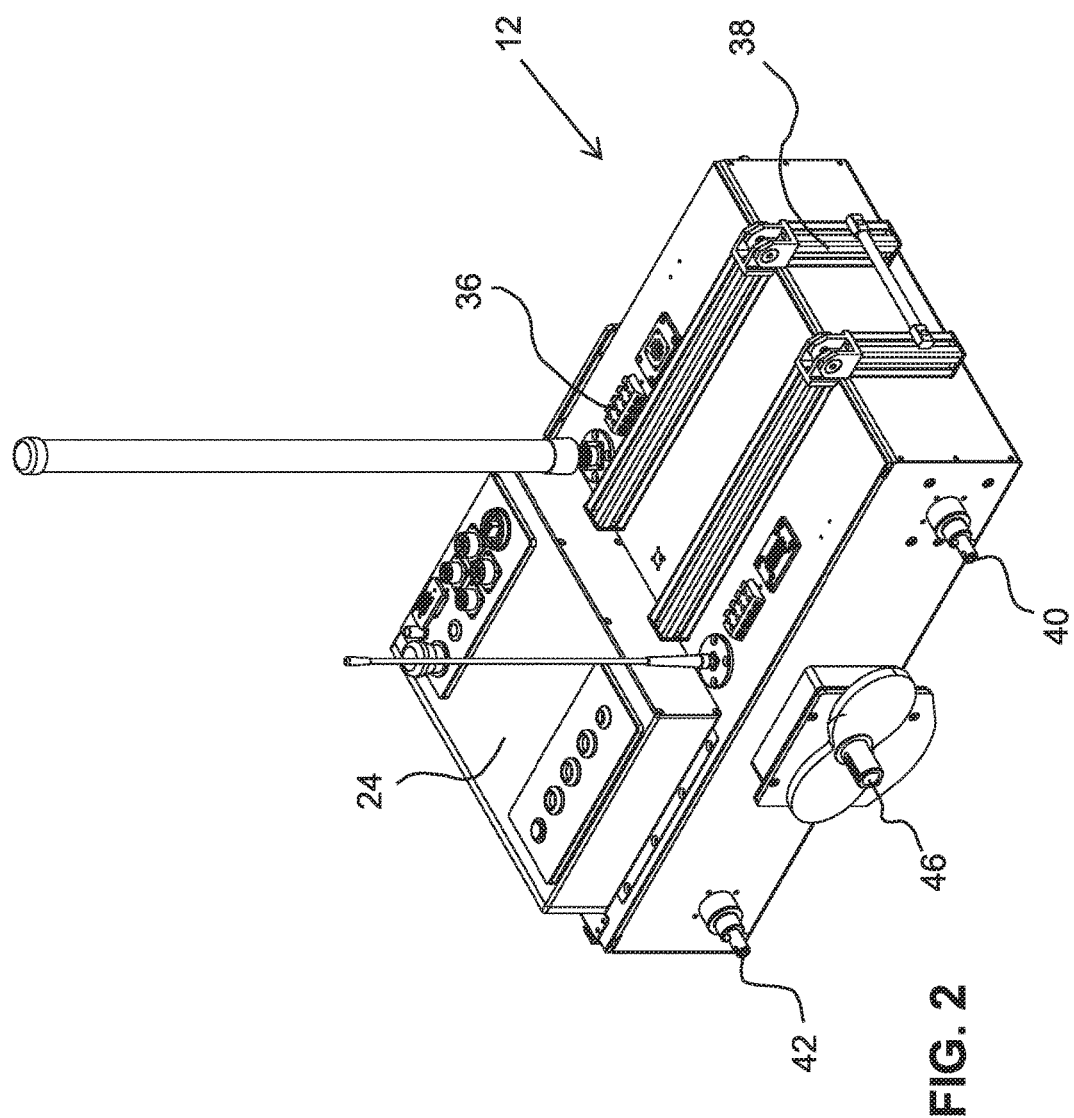
FIG. 2 is a perspective view of the platform of the dual mode vehicle of FIG. 1.
Figure 3:
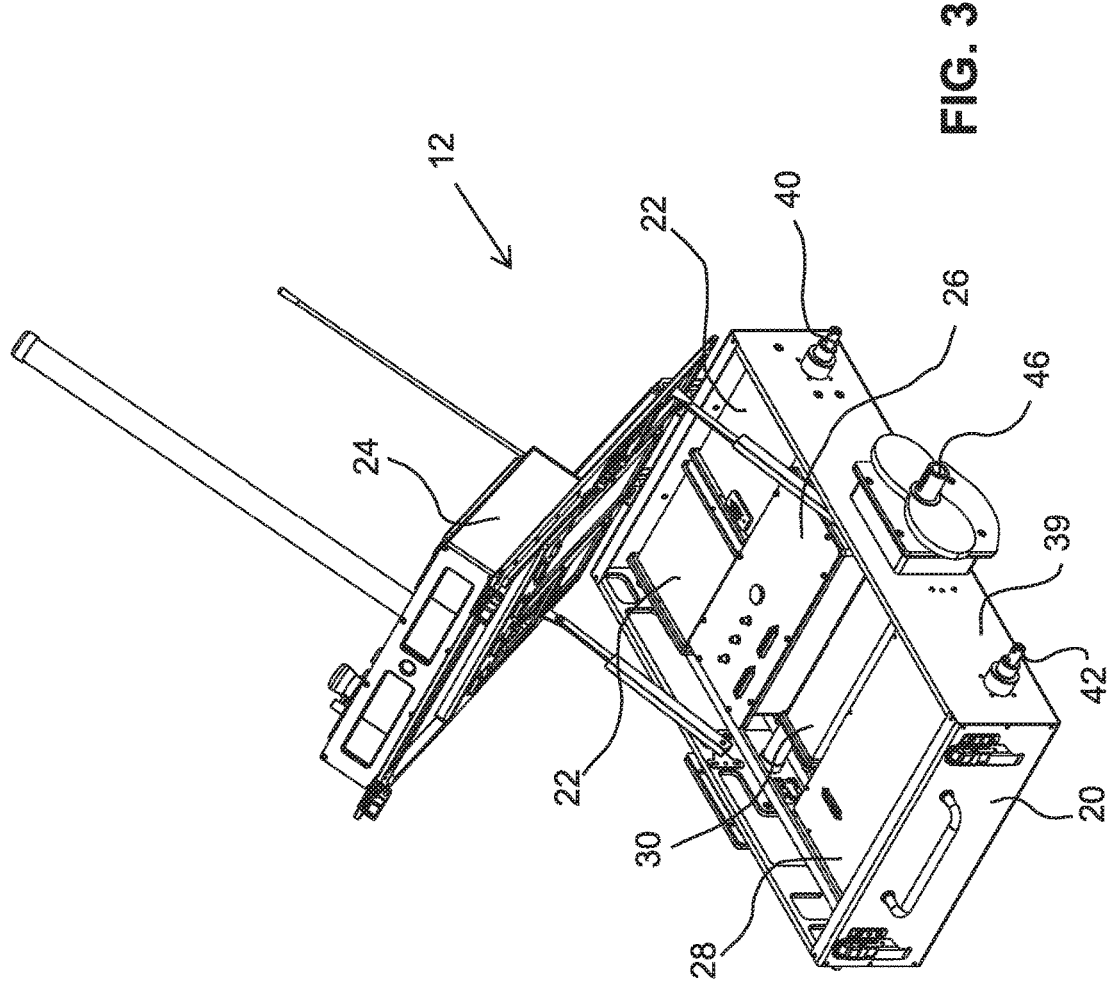
FIG. 3 is a perspective view of the platform of FIG. 2 with the lid open.
Figure 4:
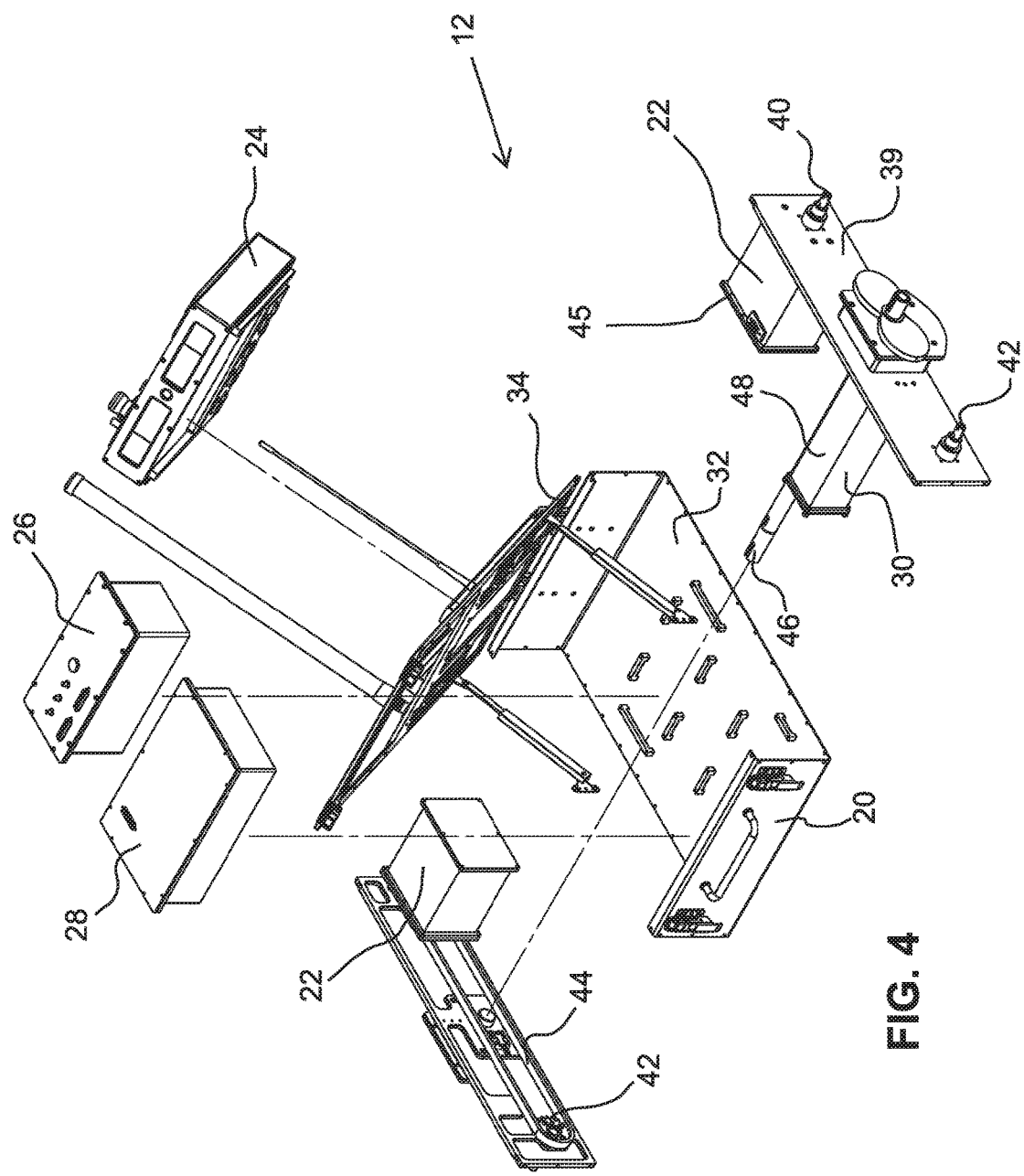
FIG. 4 is a perspective blown apart view of the platform of FIG. 2.
Figure 5:
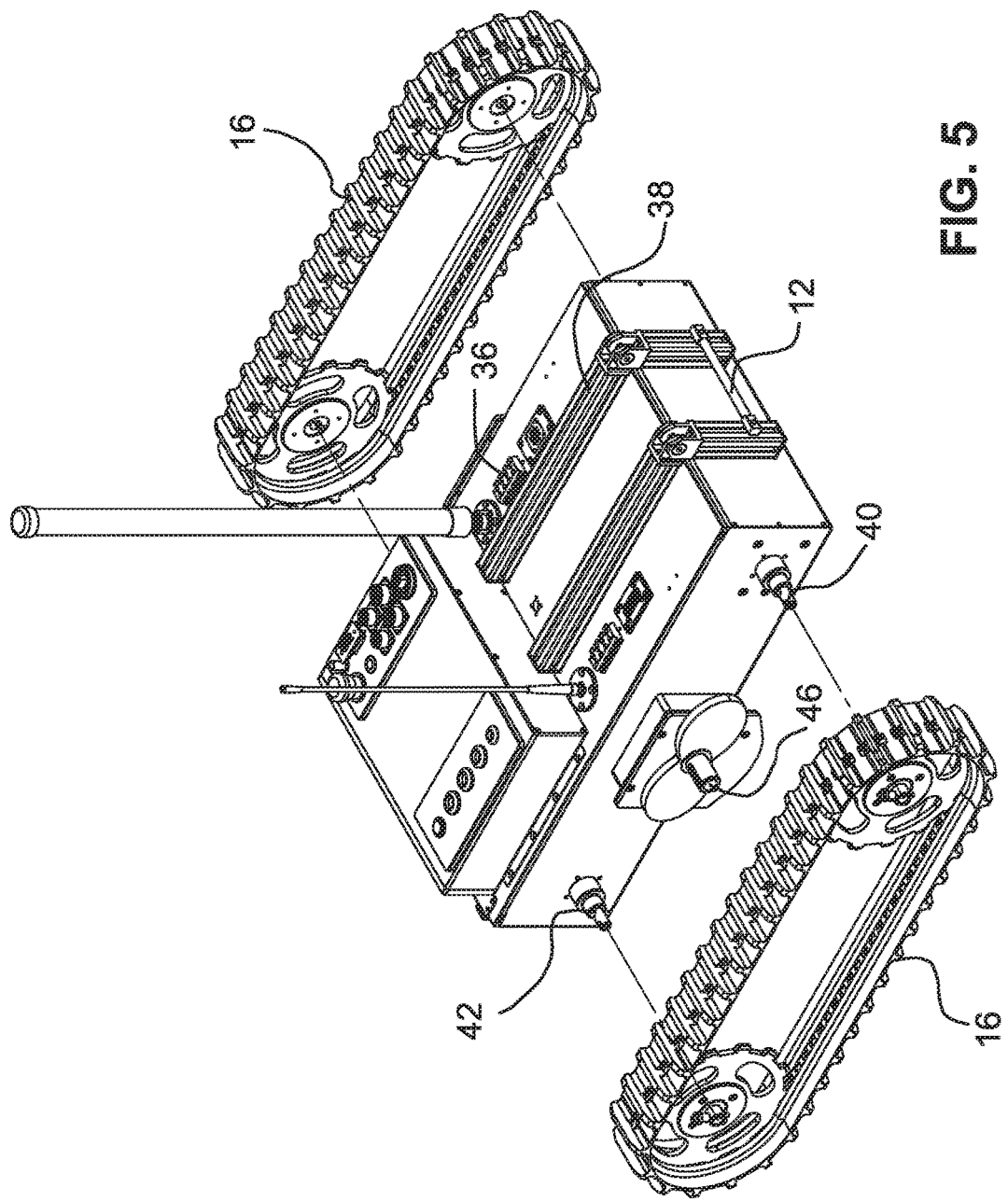
FIG. 5 is a perspective blown apart view of the platform and track module of the dual mode vehicle of FIG. 1.
Figure 6:
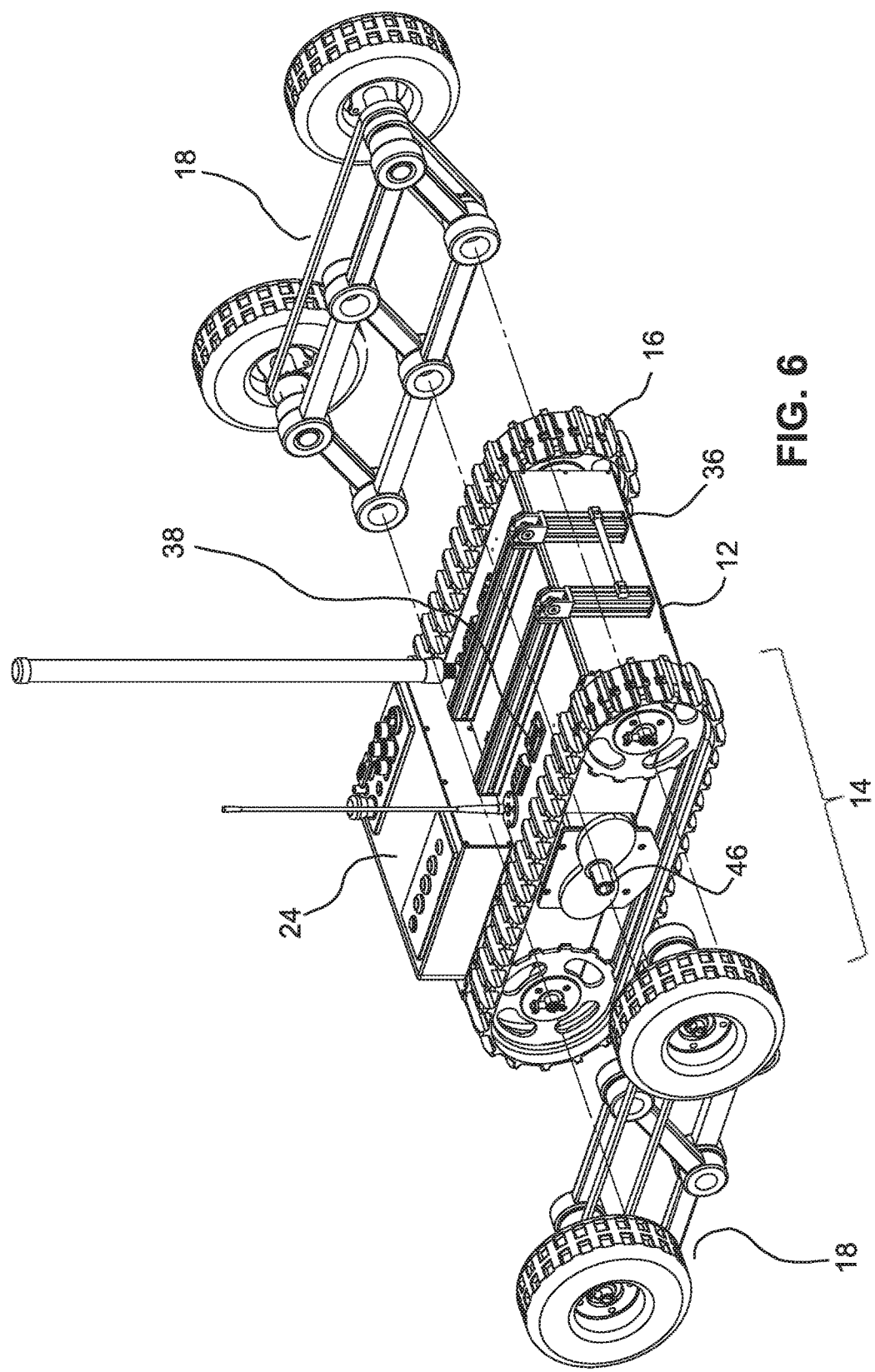
FIG. 6 is a partially blown apart perspective view of the dual mode vehicle of FIG. 1.

FIGS. 2 to 4 show the platform 12. By way of example only the platform 12 includes a number of modules such as head, core, and power modules. Preferably the modules are removable and replaceable. It will be appreciated that the modules allow for interchangeability and ease of maintenance and allow for flexibility within a fleet of robots. Platform 12 includes a chassis body module 20, two traction drive modules 22, a head module 24, a core module 26, a power module 28, and a central shaft drive module 30. Chassis body module 20 is designed to house and mount modules such as power module 28, core module 26, and head module 24. It consists of a chassis bottom 32, a chassis lid 34 with various electronic sockets 36, and rails 38 that are used to mount and support modular payloads such as a manipulator arm and a PTZ arm (not shown). It will be appreciated by those skilled in the art that the modular design of the platform is by way of example only and that a manufacturer may choose to provide the platform functionality using different modules or alternatively provide the platform functionality as one integrated unit.

Each traction drive module 22 is configured to drive a track assembly 16 and a wheel assembly 18 which in turn, are designed for terrain traction. Right and left traction drive modules 22 are similarly configured and may be removably connected to the chassis body module. Each side of the platform includes a traction drive module 22, a side plate 39, drive pulley 40 and driven pulley 42 rotatable with respect to side plate, a chain-sprocket assembly connecting to drive and driven pulleys, and a track 44 which extends around two pulleys (drive and driven pulleys). Traction drive module 22 is designed for driving the drive pulley 40 or wheel. It includes drive motor, gear head, encoder, servo motor driver, all housed in a mechanical structure 45 for housing and mounting all electronic components.

Head module 24 is a power, data and communication distribution module, and an interface module to external sensors. It is operably connected to the power module 28, the core module 26, traction drive modules 22, central shaft drive module 30 and other payload modules (not shown).

Core module 26 manages the communication to the operator control unit (not shown) for all modules and controls the motion of the robot 10. Power module 28 provides all voltages and the power for the robot 10.

Central shaft drive module 30 is designed for driving the track-wheel interchange mechanisms 50. Central shaft drive module 30 is mounted on the side plate 39. Module 30 includes a central shaft 46, a central drive shaft motor, a gear head, an encoder, a brake, a servo motor driver, and a mechanical structure 48 for housing and mounting all electronic components.

Figure 7:
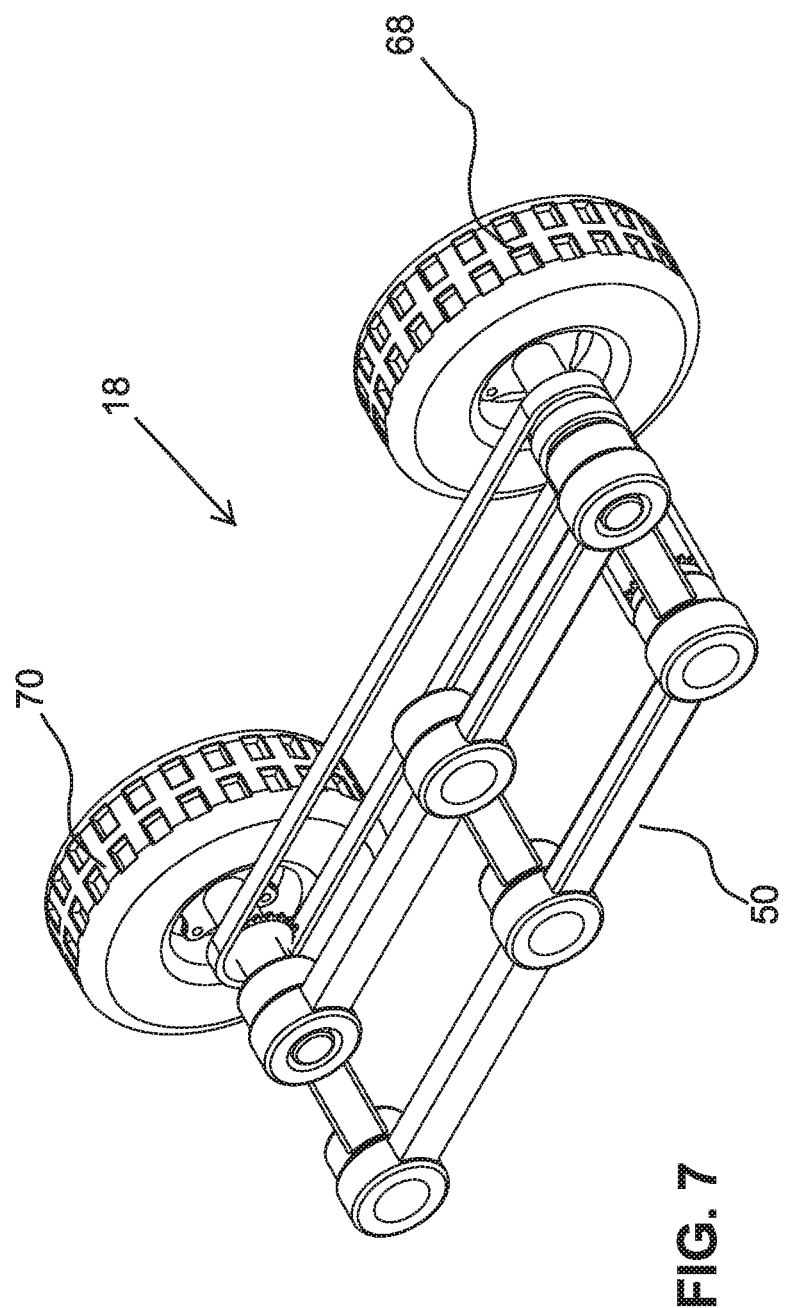
FIG. 7 is a perspective view of a pair of wheel assemblies with the track-wheel interchange mechanism of the dual mode vehicle of FIG. 1.
Figure 8:
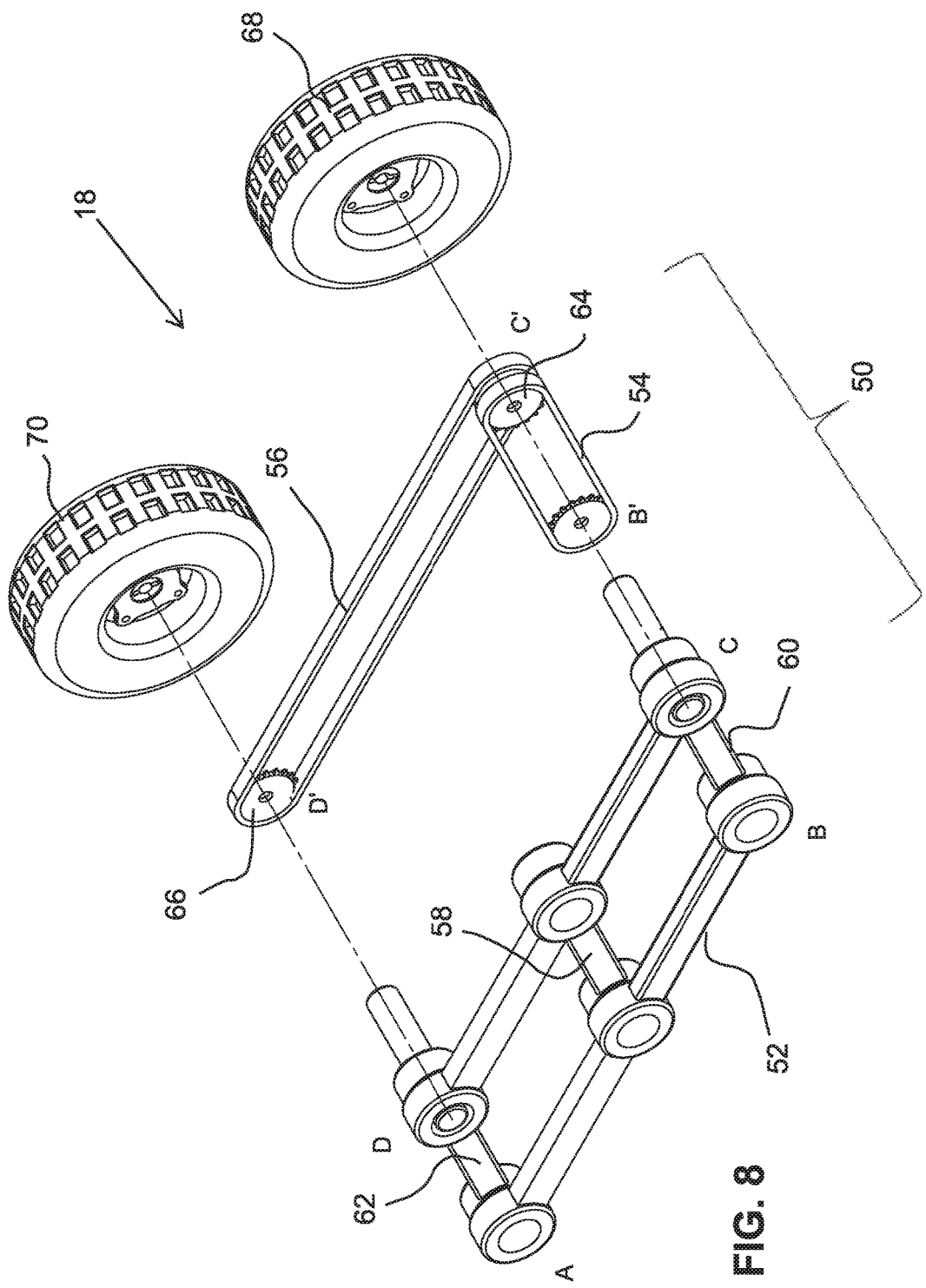
FIG. 8 is a blown apart perspective view of a pair of wheel assemblies with the track-wheel interchange mechanism of FIG. 7.

The dual mode vehicle 10 offers good terrain adaptability through the track-wheel interchange mechanism 50 which is driven by the central shaft drive module 30. The track-wheel interchange mechanism 50 shown in detail in FIGS. 7 and 8 is composed of a parallel 4-bar mechanism 52 and a first chain-sprocket mechanism 54 and a second chain-sprocket mechanism 56. Parallel 4-bar mechanism 52 includes a crank 58, a drive follower 60 and a driven follower 62. The crank 58 is operably connected to the central shaft 46 of central drive shaft module 30. Drive follower 60 is operably connected to drive pulley 40 and driven follower 62 is operably connected to driven pulley 42. Specially, drive follower 60 is connected to drive pulley 40 shaft via a clutch (not shown). Thus the traction drive module 22 is selectively connectable to the track assembly 16 or the track-wheel interchange mechanism 50. A first and a second chain-sprocket mechanisms 54, 56 are rotatably mounted on the drive follower 60 and the driven follower 62 of the 4-bar mechanism 52, i.e. connected to Joint B, C and D of the 4-bar mechanism at B', C' and D'. A first and second wheel 68, 70 are attached to the sprockets 64 and 66. The first wheel 68 is a drive wheel and the second wheel 70 is a driven wheel. Thus the first chain-sprocket mechanism 54 operably connects the drive motor, which is part of the traction drive module 22, to the drive wheel 68 and the second chain-sprocket mechanism 56 operably connects the drive wheel 68 to the driven wheel 70.

Figure 9:
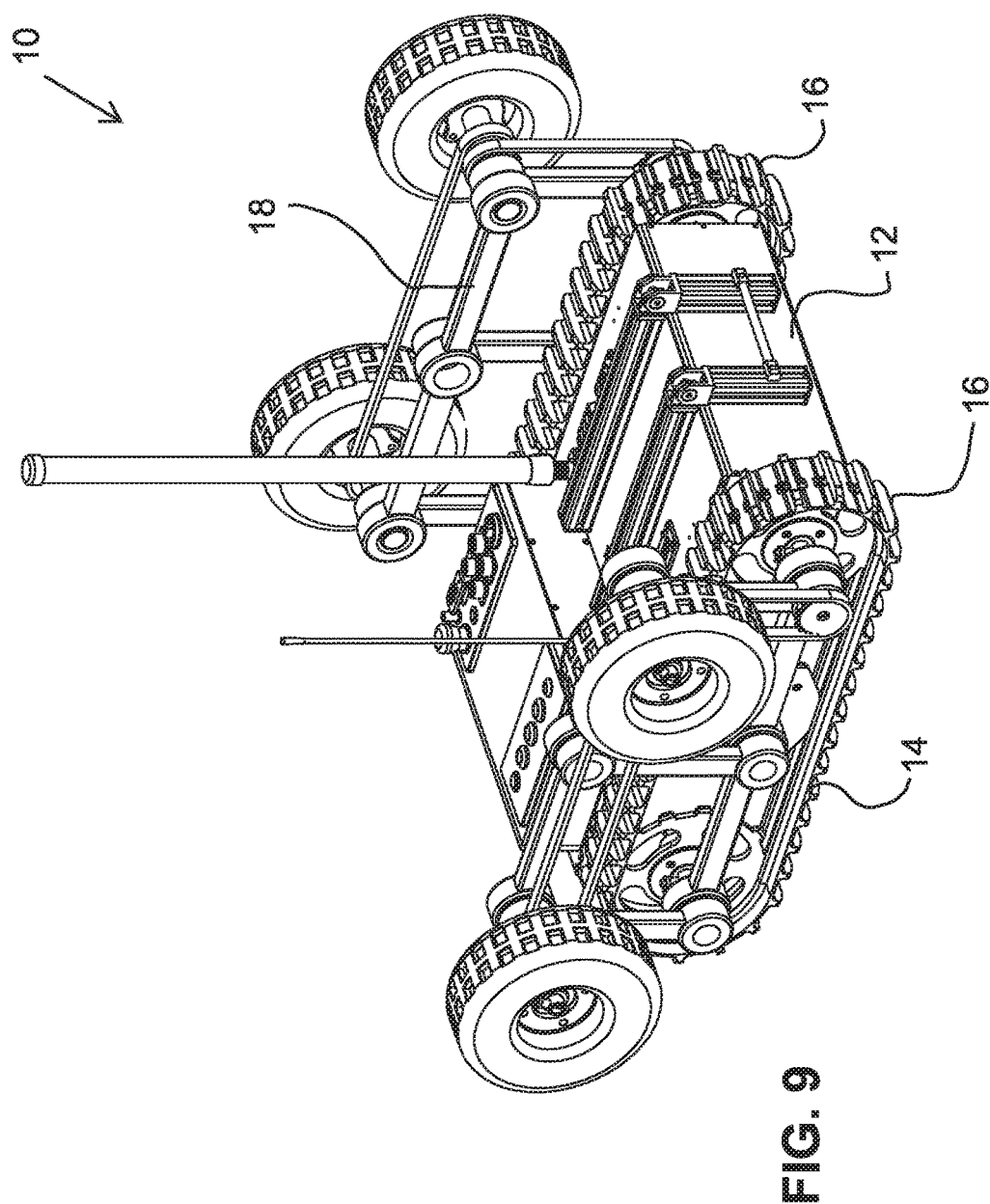
FIG. 9 is a perspective view of the dual mode vehicle in the track drive mode.
Figure 10:
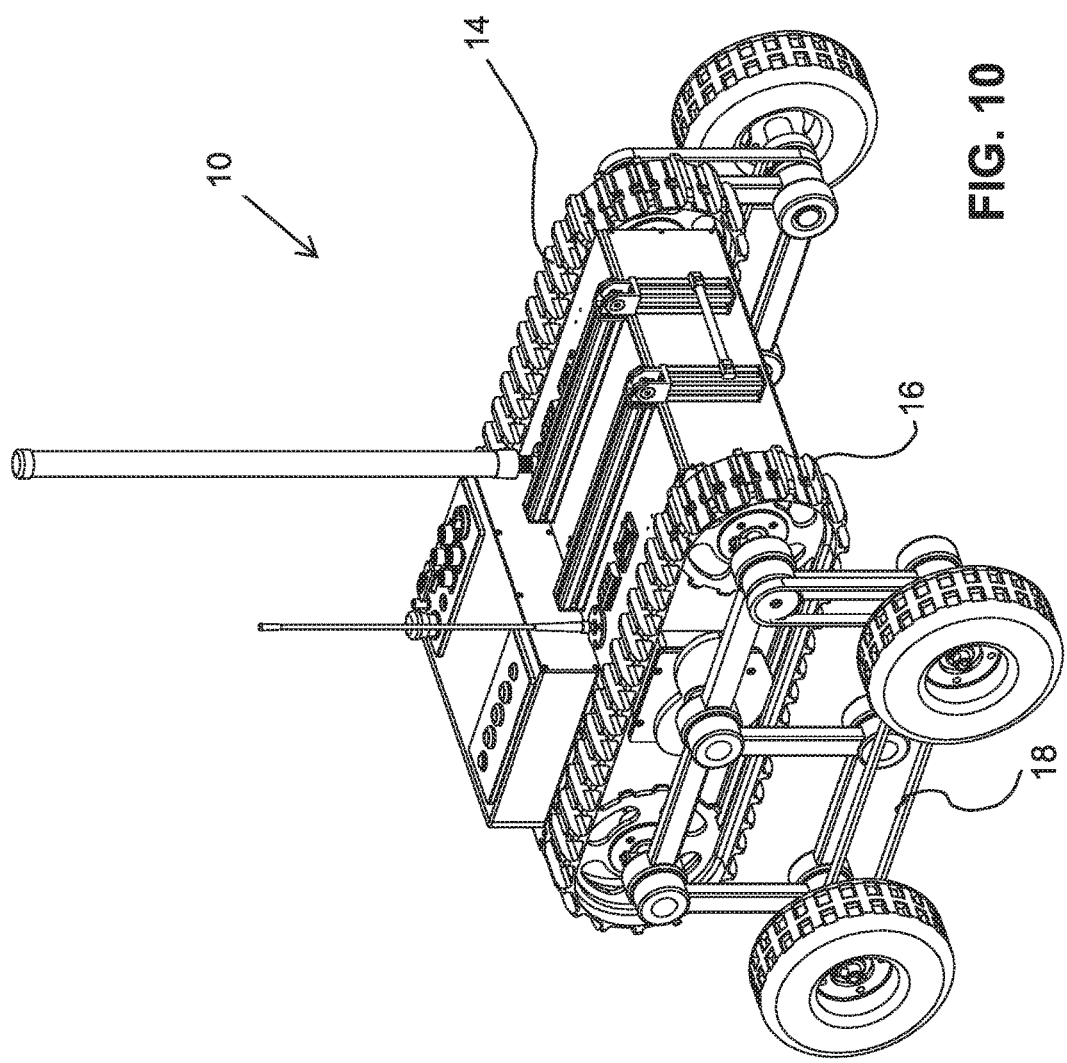
FIG. 10 is a perspective view of the dual mode vehicle in the wheel drive mode.

The track-wheel interchange mechanism 50 has two functions in two modes. In wheeled robot mode shown in FIG. 10, the mechanism acts as a driving system of the platform. In track-based robot mode shown in FIG. 9, the mechanism may work as a lifting mechanism or a flipper type mechanism. It can lift the robot's nose up to climb stairs and overcome obstacles in both directions.

The track-wheel driving module 14 may be designed as an independent module of the platform 12. Thus as a separate drive module, it may be switched with another type of drive module (not shown) such as a wheel only module or track only module that is compatible with the platform 12. The wheel and track are driven separately by the same motor, thus when the mechanism is being used as a lifting mechanism or a flipper type mechanism the wheels and both the track assembly and the wheel assembly are engaged and in this configuration the wheel are driven wheels. The dual mode vehicle 10 may be configured so that it can automatically, remotely or manually be converted from a wheeled robot to a tracked robot by rotatably moving a track-wheel interchange mechanism 50 which is a combination of a parallel 4-bar mechanism and two chain-sprocket mechanisms (or timing belt mechanisms) described in more detail below. Thus the first timing belt mechanism operably connects the drive motor, which is part of the traction drive module 22, to the drive wheel 68 and the second timing belt mechanism connects the drive wheel 68 to the driven wheel 70.

Figure 11:
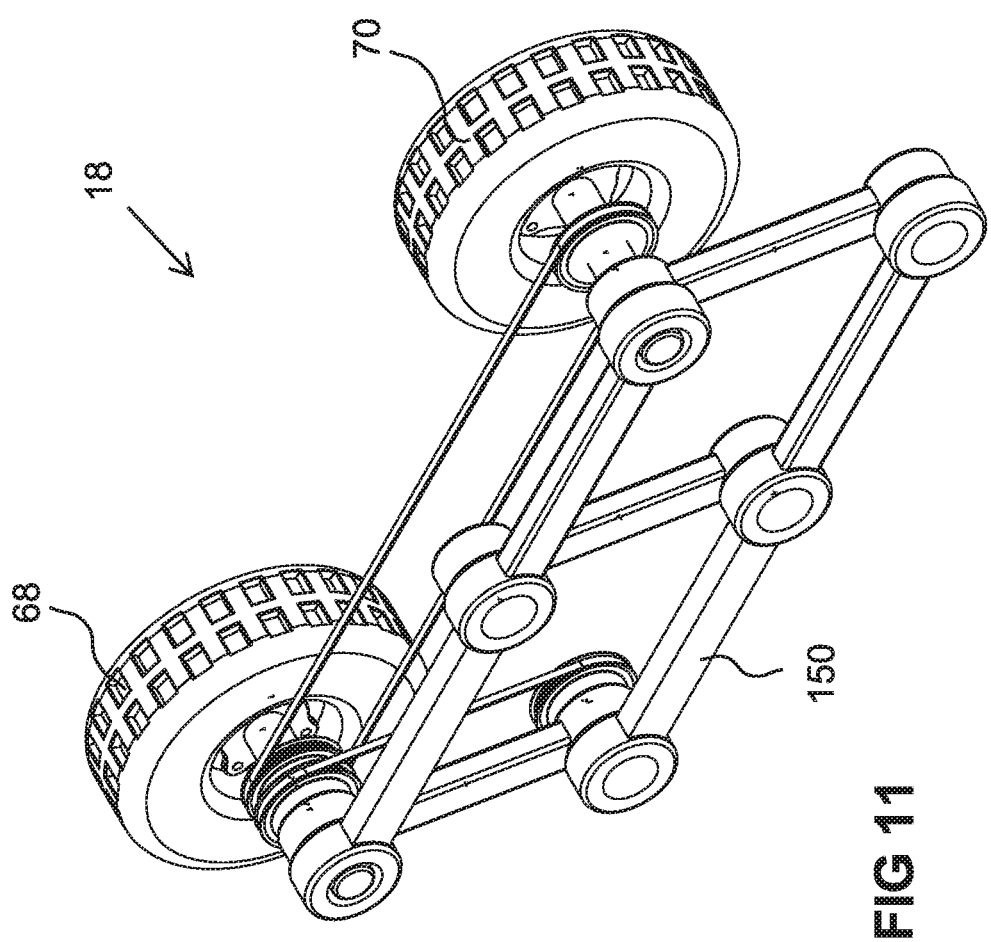
FIG. 11 is a perspective view of the track-wheel interchange mechanism of the dual mode vehicle similar to that shown in FIG. 7 but showing a timing belt mechanism rather than the chain and belt mechanism shown in FIG. 7.
Figure 12:
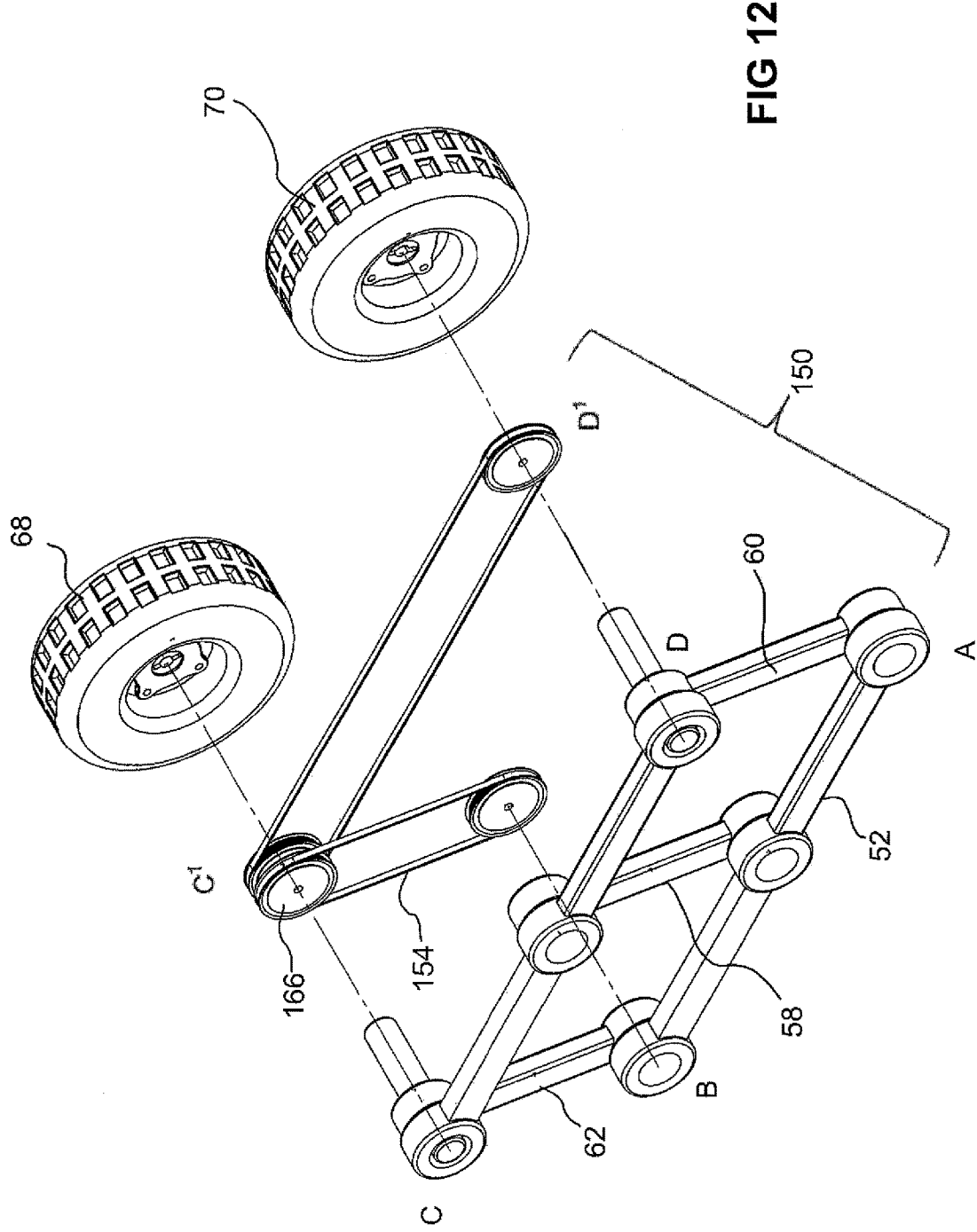
FIG. 12 is a blown apart perspective view of the track-wheel interchange mechanism of FIG. 11.

An alternate embodiment of the wheel assembly 18 is shown in FIGS. 11 and 12. The track-wheel interchange mechanism 150 is a parallel 4-bar mechanism and two timing belt mechanism. Mechanism 150 includes a 4-bar mechanism 52 and a first timing belt mechanism 154 and a second timing belt mechanism 156. As described above, parallel 4-bar mechanism 52 includes a crank 58, a drive follower 60 and a driven follower 62. The crank 58 is operably connected to the central shaft 46 of central drive shaft module 30. Drive follower 60 is operably connected to drive pulley 40 and driven follower 62 is operably connected to driven pulley 42. Specially, drive follower 60 is connected to drive pulley 40 shaft via a clutch (not shown). Thus the traction drive module 22 is selectively connectable to the track assembly 16 or the track-wheel interchange mechanism 150. A first and a second timing belt mechanisms 154, 156 are rotatably mounted on the drive follower 60 and the driven follower 62 respectively of the 4-bar mechanism 52, i.e. connected to Joint B, C and D of the 4-bar mechanism at B', C' and D'. A first and second wheel 68, 70 are attached to the sprockets 64 and 66. The first wheel 68 is a drive wheel and the second wheel 70 is a driven wheel. Thus the first timing belt mechanism 154 operably connects the traction drive motor, which is part of the traction drive module 22, to the drive wheel 68 and the second timing belt mechanism 156 operably connects the drive wheel 68 to the driven wheel 70. The dual mode vehicle 10 offers good terrain adaptability through the track-wheel interchange mechanism 50, 150 that is driven by a motor through a shaft located in the middle of the chassis side panels. The track-wheel interchange mechanism 50, 150 has two functions in two modes. In wheeled robot mode, the mechanism 50, 150 acts as the driving system of the platform. In track-based robot mode, the mechanism 50, 150 acts as the lifting mechanism (also called flipper) to lift the robot's nose up to climb stairs or overcome obstacles in both directions.

The dual mode vehicle 10 includes three drive systems (i.e. three motors). Two drive systems are for platform traction; the third drive system is not only for interchanging between wheel and track modes, but also to control the parallel 4-bar mechanism 52 and make it work as a flipper.

The track assembly 16 includes a track 72 positioned around a drive pulley 74 and driven pulley 76. Drive pulley 74 is operably connected to traction drive module 22.

The wheel assembly 18 may have a drive 68 and driven wheels 70 operably attached to the parallel 4-bar mechanism 52 and connected to the drive module 22. The drive wheel 68 is operably connected to the drive module 22 (motor) and to the driven wheel 70 via a first and a second chain-sprocket (or timing belt) mechanisms 54, 56, respectively.

The parallel 4-bar mechanism 52 is operably attached to the shafts of pulleys 40, 42 and the shaft 46 at the center of the platform 12. The configuration of mechanism 52 is controllable by rotating the center shaft 46. The parallel mechanism 52 is modular and can be attached and detached to and from the platform, respectively.

The dual mode vehicle platform can be used with tracks, wheels, or both, all independently.

FIGS. 13 A to D show, by way of example, the stair climbing process of dual mode vehicle 10. FIG. 13 A shows step 1: Rotating the track-wheel interchange mechanism 50,150 until the wheel 68 or 70 is over the first step of the stairways, and driving the dual mode vehicle 10 to close the stairs. FIG. 13 B shows step 2: Moving dual mode vehicle 10 forward until the front pulleys 74 or 76 climb over the first step of the stairway. FIG. 13 C shows step 3: Rotating the track-wheel interchange mechanism 50,150 until the wheels 68 or 70 of the robot 10 are at the back and starting climb. FIG. 13 D shows step 4: ascending the stairs.

FIGS. 14 A to E show, by way of example, the ditch crossing process of dual mode vehicle 10. FIG. 14 A shows step 1: Moving dual mode vehicle 10 forward to close the ditch. FIG. 14 B shows step 2: Clockwise rotating the track-wheel interchange mechanism 50,150 to the horizontal position and moving dual mode vehicle 10 forward to cross the ditch. FIGS. 14 C to E show steps 3-5: Continuously moving the mobile vehicle 10 until the front track pulley 74 or 76 touches the edge of the ditch, then rotating the track-wheel interchange mechanism 50,150 anticlockwise to the back and crossing the ditch.

Generally speaking, the systems described herein are directed to mobile vehicles. Various embodiments and aspects of the disclosure will be described with reference to details discussed below. The following description and drawings are illustrative of the disclosure and are not to be construed as limiting the disclosure. Numerous specific details are described to provide a thorough understanding of various embodiments of the present disclosure. However, in certain instances, well-known or conventional details are not described in order to provide a concise discussion of embodiments of the present disclosure.

As used herein, the terms, "comprises" and "comprising" are to be construed as being inclusive and open ended, and not exclusive. Specifically, when used in the specification and claims, the terms, "comprises" and "comprising" and variations thereof mean the specified features, steps or components are included. These terms are not to be interpreted to exclude the presence of other features, steps or components.

As used herein, the term "exemplary" means "serving as an example, instance, or illustration," and should not be construed as preferred or advantageous over other configurations disclosed herein. As used herein the "operably connected" or "operably attached" means that the two elements are connected or attached either directly or indirectly. Accordingly the items need not be directly connected or attached but may have other items connected or attached therebetween.

What is claimed is:

1. A mobile vehicle comprising:
   a platform having opposing sides and each side having a pair of spaced apart pulleys and each pulley having a shaft;
   a pair of track assemblies attached to the pair of pulleys on the opposing sides of the platform; and
   a pair of wheel assemblies attached to opposing sides of the platform and each wheel assembly having at least a first and second wheel and a parallel 4-bar mechanism connected to the shafts of the pair of pulleys and operably connected to the first and second wheel and the parallel 4-bar mechanism rotatably moves the first and second wheel from a wheel mode wherein the wheels drive the mobile vehicle to a track mode wherein the track assemblies drive the mobile vehicle.

2. The mobile vehicle as claimed in claim 1 wherein the parallel 4-bar mechanism has a front and back intermediate mode wherein the track assemblies and the wheel assemblies work together to drive the mobile vehicle.

3. The mobile vehicle as claimed in claim 1 wherein the first wheel is a drive wheel and the second wheel is a driven wheel and wherein the pair of pulleys is a drive pulley and a driven pulley and the drive pulley is operably connected the drive wheel and the driven pulley is operably attached to the driven wheel.

4. The mobile vehicle as claimed in claim 1 wherein the parallel 4-bar mechanism includes a crank that is operably connected to a central shaft which is driven by a central shaft drive motor.

5. The mobile vehicle as claimed in claim 4 wherein the central shaft drive motor is included in a central drive shaft module.

6. The mobile vehicle as claimed in claim 4 wherein the parallel 4-bar mechanism further includes a drive follower and a driven follower and the drive follower is operably connected to a traction drive motor.

7. The mobile vehicle as claimed in claim 6 wherein the parallel 4-bar mechanism further includes a first and a second chain-sprocket mechanism.

8. The mobile vehicle as claimed in claim 7 wherein the at least first and second wheel include a drive wheel and a driven wheel and the first chain-sprocket mechanism operably connects the traction drive motor to the drive wheel and the second chain-sprocket mechanism connects the drive wheel to the driven wheel.

9. The mobile vehicle as claimed in claim 6 wherein parallel 4-bar mechanism further includes a first and a second timing belt mechanism.

10. The mobile vehicle as claimed in claim 9 wherein the at least first and second wheel include a drive wheel and driven wheel and the first timing belt mechanism operably connects the traction drive motor to the drive wheel and the second timing belt mechanism connects the drive wheel to the driven wheel.

11. The mobile vehicle as claimed in claim 6 wherein the pair of pulleys include a drive pulley and a driven pulley and each track assembly includes a track positioned around the drive pulley and the driven pulley wherein the drive pulley is operably connected to the traction drive motor.

12. The mobile vehicle as claimed in claim 11 wherein the traction drive motor is included in a traction drive module.

13. The mobile vehicle as claimed in claim 1 further including a pair of traction drive modules, each traction drive module is operably connected to one of the pair of track assemblies and wheel assemblies, the pair of traction drive modules having a track drive mode and a wheel drive mode.

14. The mobile vehicle as claimed in claim 13 wherein each traction drive module has one motor that is selectively connectable to one of the pair of track assemblies and one of the pair of wheel assemblies.

15. The mobile vehicle as claimed in claim 1 wherein the pair of track assemblies and the pair of wheel assemblies form a pair of track-wheel driving modules attached to the opposing sides of the platform.

16. The mobile vehicle as claimed in claim 1 wherein the pair of wheel assemblies rotates from the track mode to the wheel mode responsive to a remote control command.

17. The mobile vehicle as claimed in claim 1 wherein the pair of wheel assemblies rotates from the track mode to the wheel mode autonomously.

18. The mobile vehicle as claimed in claim 1 wherein the platform includes a head module, a core module and a power module that are removable and replaceable.

* * * * *